United States Patent [19]

Giraud

[11] 4,067,421

[45] Jan. 10, 1978

[54] BRAKING BALANCE FOR VEHICLE MOVING ON CONVEYOR

[75] Inventor: Francois Louis Giraud, Maurepas, France

[73] Assignee: Savec, Societe Anonyme, Maurepas, France

[21] Appl. No.: 615,828

[22] Filed: Sept. 22, 1975

[30] Foreign Application Priority Data

Sept. 23, 1974 France .................................. 74.31983

[51] Int. Cl.² .............................................. B60T 8/22
[52] U.S. Cl. .................................... 188/195; 104/1 R; 180/100; 188/83
[58] Field of Search .................... 104/1 R, 147 R, 165, 104/243, 245; 188/195, 38, 43, 44, 111, 83; 180/100

[56] References Cited

U.S. PATENT DOCUMENTS

| 581,501 | 4/1897 | Allen | 188/111 X |
|---|---|---|---|
| 2,195,508 | 4/1940 | Browall | 188/195 |
| 2,777,546 | 1/1957 | Kelley | 188/195 X |
| 2,989,152 | 6/1961 | Butler | 188/195 |
| 3,339,675 | 9/1967 | Bingham | 188/43 |
| 3,404,746 | 10/1968 | Slay | 104/245 X |
| 3,442,557 | 5/1969 | Oberthur | 188/195 X |
| 3,460,871 | 8/1969 | Keller et al. | 188/195 X |
| 3,690,267 | 9/1972 | Sutton | 104/165 |
| 3,807,312 | 4/1974 | Flodell | 104/147 R |
| 3,855,936 | 12/1974 | Schwarzkopf | 104/243 X |

Primary Examiner—Albert J. Makay
Assistant Examiner—Randolph A. Reese

[57] ABSTRACT

This invention relates to a transportation system comprising vehicles moved on a conveyor, guided and partly supported by wheels rolling on a guiding rail, and provided with at least one braked wheel coming into contact with braking ramps transferring the vehicles from the conveyor to stations, and with launching ramps transferring the vehicles from the station to the conveyor. A load carrying platform is connected at its corners by vertically elastic coupling members to an underframe wherein supporting and guiding members are fastened, transmitting its weight to a center of articulation where it leans on the underframe; and a braking assembly is located straight below the center of articulation in such a manner as to transmit the leaning reaction to braking members liable to come into contact with longitudinal track components.

6 Claims, 7 Drawing Figures

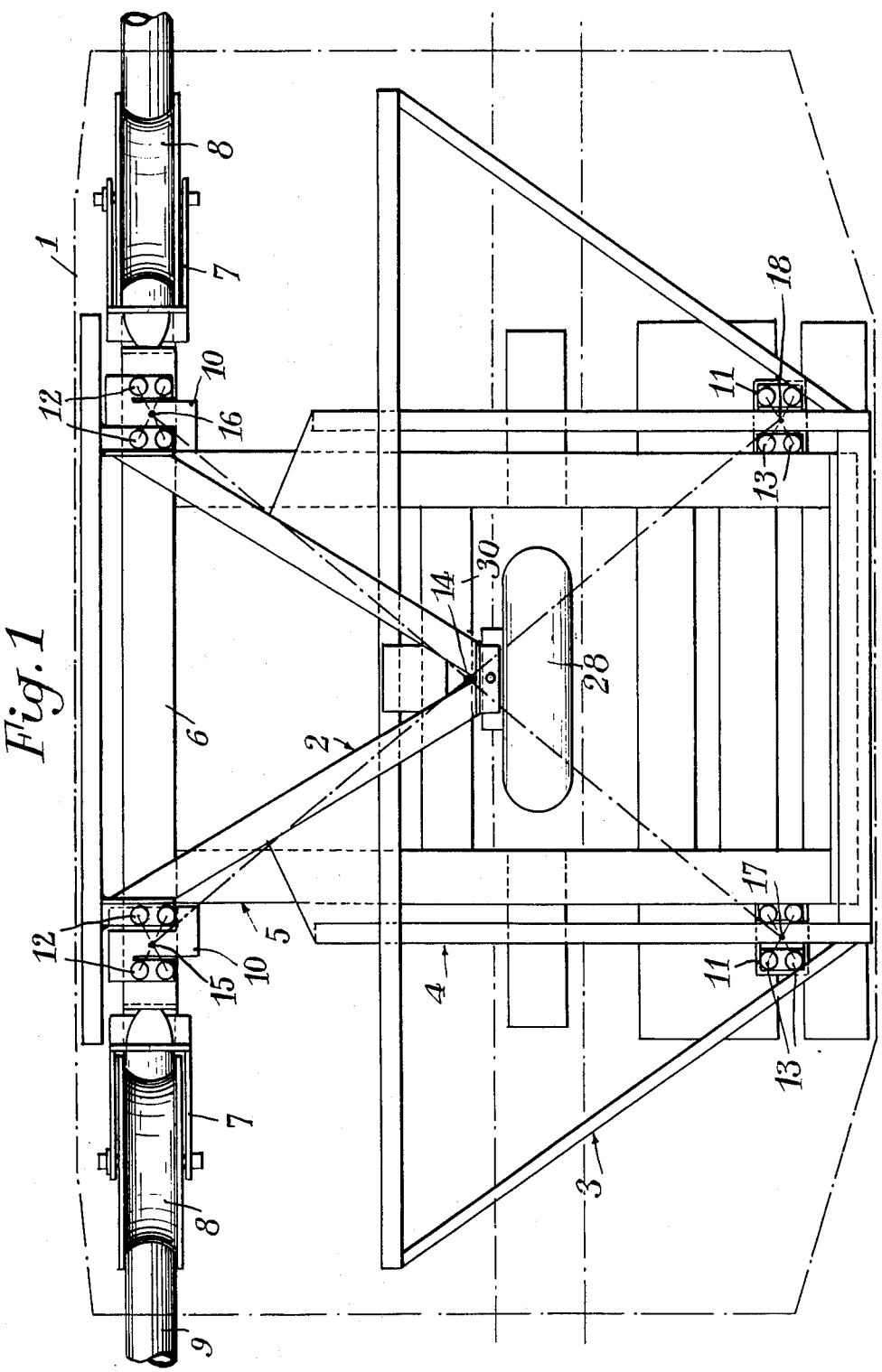

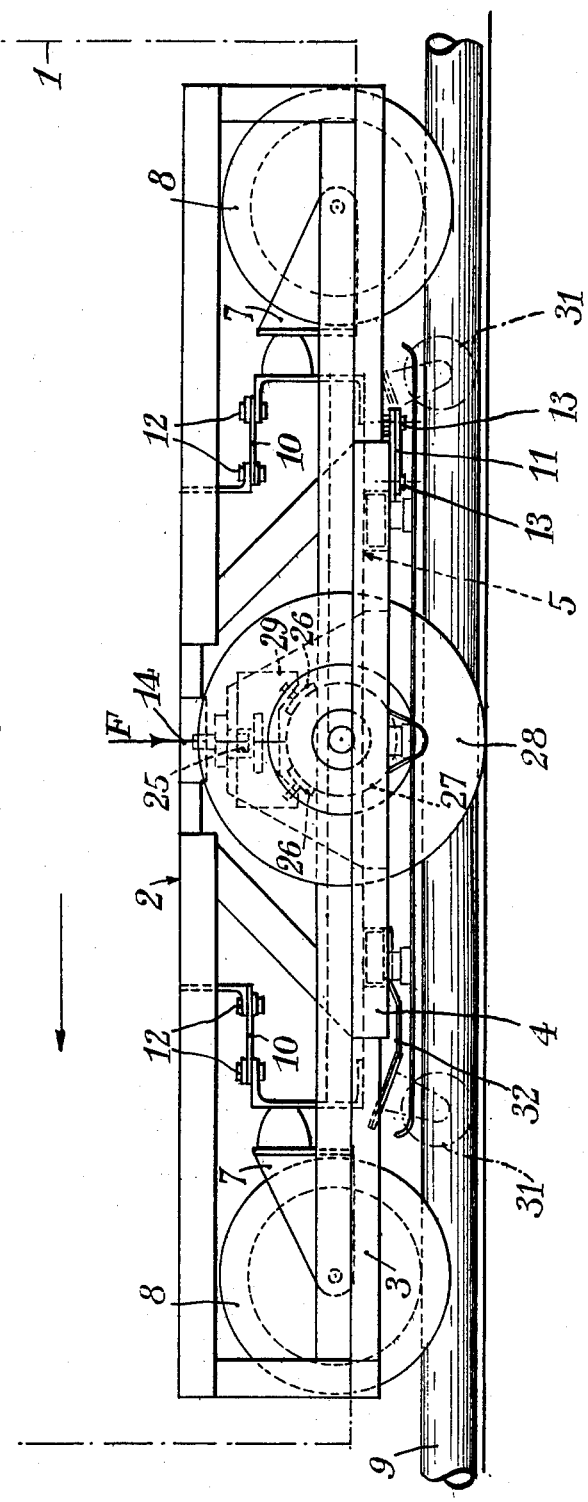

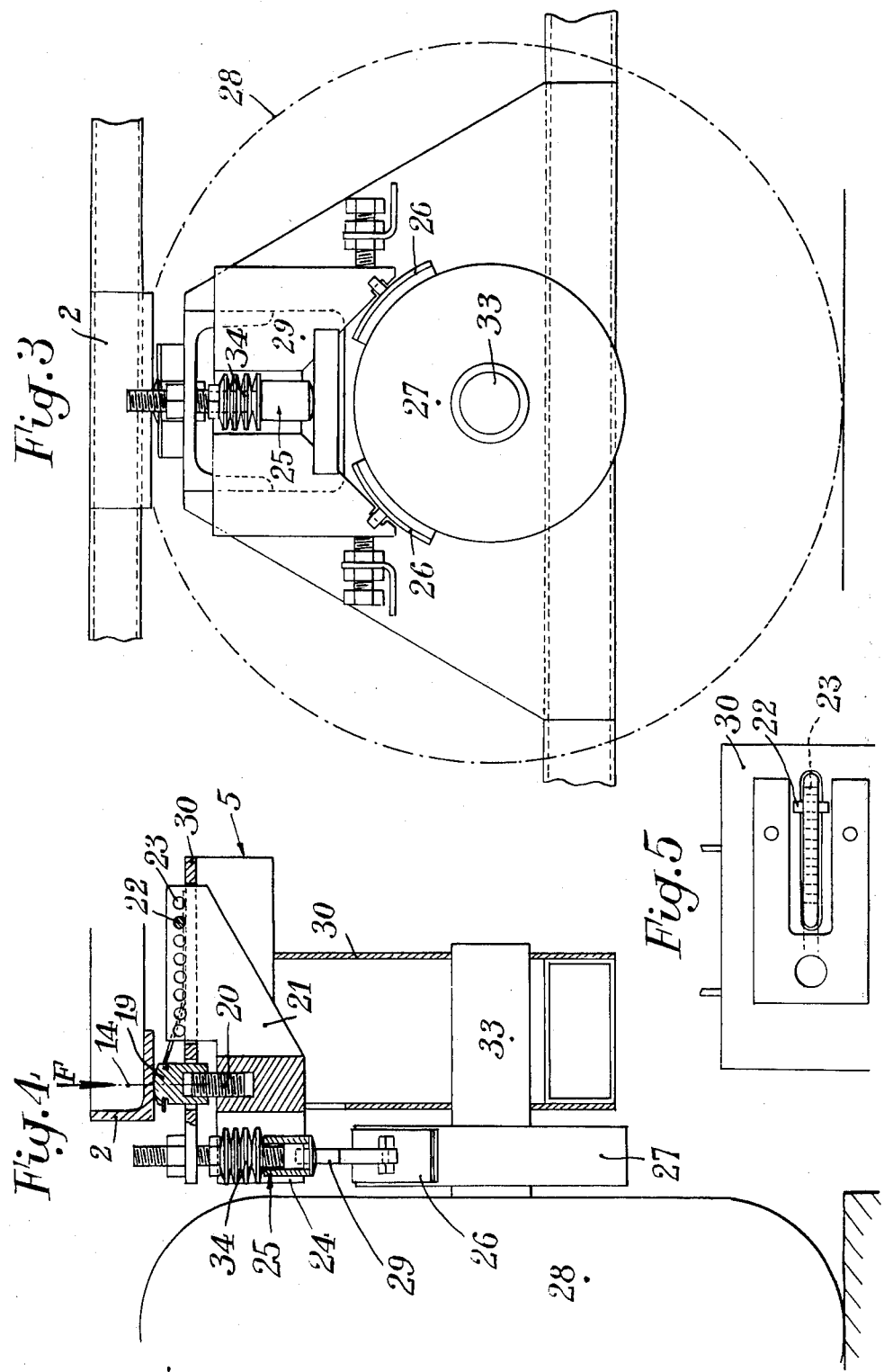

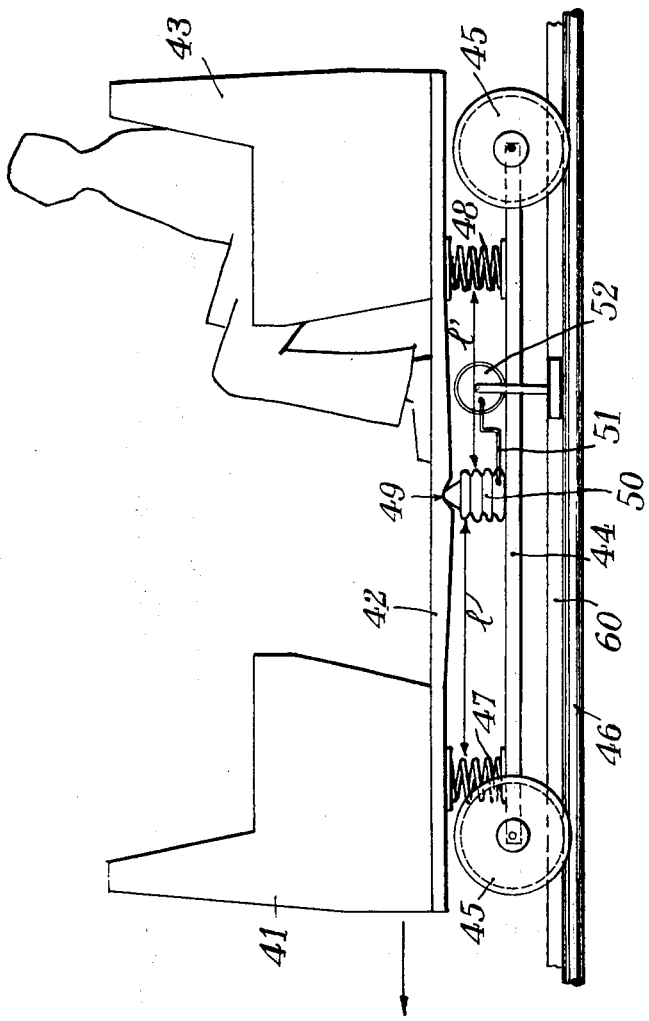
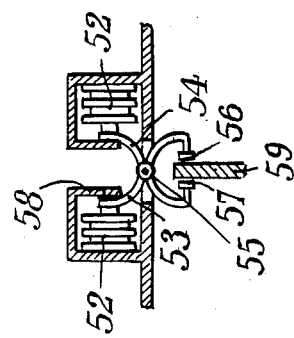

BRAKING BALANCE FOR VEHICLE MOVING ON CONVEYOR

BACKGROUND OF THE INVENTION

This invention relates to a transportation system comprising a plurality of guided vehicles, for instance of the type in which vehicles are moved on a conveyor, guided and partly supported by wheels rolling on a guiding rail, and provided with at least one braked wheel coming into contact with braking ramps transferring the vehicles from the conveyor to stations, and with launching ramps transferring the vehicles from the station to the conveyor.

As it is well known, a force applied to a vehicle in motion imparts to it an acceleration of a deceleration, depending upon the direction of the force compared to that of the motion.

The primary purpose of the invention is to provide a system able to control a force applied to the vehicle which is the reaction, parallel to the direction of the motion, of a longitudinal track component applied on the vehicle, through auxiliary means forming part of the vehicle, coming into contact with said track components at suitable places along the track, and providing a braking force which progressively cancels the relative velocity between the vehicle and the track component. If this component does not move, or moves in the direction of the motion more slowly than the vehicle, the braking force slows down the vehicle to the track component velocity, which may be zero; whereas if the track component moves faster than the vehicle, the same braking force with respect to said component accelerates the vehicle.

Therefore a transportation system related to the invention consists of vehicles comprising supporting and guiding means and an automatic brake-clutch system acting upon the motion of the vehicles relative to longitudinal track components.

We still remain in the field of the invention if the vehicle supporting and guiding means varied, being skis or air-cushions for instance instead of wheels; or if the means of propulsion are varied, the vehicle being for instance pulled by a cable or provided with a motor instead of being moved by a conveyor; on condition that means are provided for cancelling the propulsive effect on the vehicle when the braking means act upon it.

In the same fashion, we still remain in the field of the invention when changing the auxiliary means aboard the vehicle, where the braking force is applied : these means may be brake shoes directly contacting a longitudinal track component, or at least one auxiliary wheel braked on a drum, or on a disk, or any system providing a braking force proportional to the normal force on the brake. In accordance with the chosen auxiliary brake-clutch means, the track component able to come into contact thereto may be a vertical strip or a fixed ramp or a ramp fitted with a slow or a fast belt.

Indeed the purpose of the invention describing the automatic brake-clutch device is to provide a novel improvement of the French certificate of utility No. 71.27850 of July 2, 1971, particularly to provide a braking force that is proportional to the weight of the vehicle whatever the load and its distribution within the vehicle.

In many applications, such as automatic handling, transportation systems, it is essential to obtain a force that is proportional to the moving mass in order to change the speed in constant space and time with a very small dispersion. Using control means might result in insufficient precision, unless the moving mass is measured in some manner and this measure used to generate a signal proportional to it. This amounts to weighing the vehicle at any time. However, weighing a load which may consist of passengers that are anywhere and in any number in a vehicle for instance requires the use of some techniques which are described below.

SUMMARY OF THE INVENTION

It is an object of the invention to provide a braking device in relationship with the vehicle load comprising : a load carrying platform connected at its corners by vertically elastic coupling means to an underframe wherein supporting and guiding means are fastened, transmitting its weight to a center of articulation where it leans on the underframe; and a braking assembly located straight below the center of articulation in such a manner as to transmit the leaning reaction to braking means liable to come into contact with longitudinal track components.

The elastic coupling means connecting the platform and the underframe must have elastic stiffnesses in inverse ratio to their distance from the center of articulation, in order that the reaction upon this center be always equal to the platform weight, whatever the distribution of the load in the vehicle.

Now, the total moving mass comprises not only the randomly distributed mass of the platform, but also the unsprung mass of the underframe. Finally it is desired to achieve a braking force proportional to the total moving mass, and to adjust the ratio of this braking force to the mass. Therefore it is further an object of the invention to provide independent actions from the loading platform and from a spring generating a constant braking force. Another object of the invention is a lever allowing to adjust the intensity of the braking force of the load carrying platform.

BRIEF DESCRIPTION OF THE DRAWINGS

The invention will be more readily understood, and its objects more particularly emphasized in the following description with reference to the accompanying drawings in which :

FIG. 1 is a plan view of a vehicle moving on a conveyor, restricted to the vehicle frame, underframe, guiding means and braking means.

FIG. 2 is a elevation view corresponding to FIG. 1.

FIG. 3 is an enlarged elevation view of a portion of FIG. 2 showing the brake-clutch system consisting of a braked wheel.

FIG. 4 is a side elevation view corresponding to FIG. 3.

FIG. 5 is a plan view showing a detail of a lever, a component of the brake-clutch system.

FIG. 6 is a schematic elevation view of a guided vehicle for passengers, illustrating the mechanism of braking system within the scope of the invention.

FIG. 7 is a side elevation view of a part of FIG. 6 also showing a vertical strip parallel to the track.

DESCRIPTION OF THE PREFERRED EMBODIMENT

In FIG. 1 the vehicle represented by a dashed line is supported by a double frame : an upper frame or platform which is an assembly of metallic beams with a triangular element 2, a trapezoidal element 3 and a rectangular part 4 welded all together; a nearly rectangular underframe 5 supporting a longitudinal member 6 whereon forks 7 are mounted at its ends for receiving the double flanged wheels 8 rolling on a cylindrical rail 9.

The upper frame 2, 3, 4 is connected to the underframe 5, 6 by vertically elastic coupling means : the blades 10 fastened on the longitudinal member 6 by bolts 12; and the blades 11 fastened on the opposite side by bolts 13.

A center of articulation 14 of the upper frame elastically suspended in 15, 16, 17 and 18 is located under the member 30 at the intersection of the dashed diagonal lines joining 13-15 and 16-17, if the four blades have equal stiffnesses in the vertical direction. Straight below the articulation point 14, of upper frame 2, 3, 4 a brake-clutch assembly is mounted, which is shown on FIGS. 3 to 5.

This assembly consists of a cap 19 the height of which is adjusted by an adjusting-screw 20 screwed on a supporting lever 21 bearing on the transverse intermediate member 30 of the underframe 5 through the pin 22 engaged in one of the holes 23 provided in the supporting lever 21.

This supporting lever 21 is acted upon downwards on one hand by the assembly 34 of elastic rings exerting a force through the fork-joint 24 bearing on the beam 30 : this assembly is the taring brake providing an adjustable force, thus allowing for a braking tare proportional to the weight of the underframe.

On the other hand, the vertical reaction of the upper frame or load carrying platform on the articulation center 14 is equal to the total suspended weight and is transmitted to the cap 19 integral with the supporting lever 21 causing a tipping of this lever around the axle 22. The brake of the wheel 28, which is supported by an axle 33 on the beam 30, consists of brake shoes 26 bearing on a drum 27 integral with the wheel 28 and acted upon by a fork 29 integral with the fork-joint 24, and therefore by the vertical displacement of the supporting lever 21 which is integral part of the brake assembly.

It is well understood that when a load is exerted upon the upperframe 2, 3, 4 in the directin of the arrow F, the beam 2 bears upon the cap 19, thus generating a tipping of the supporting lever 21 around the pin 22 and a lowering of the fork 29 which in turn leans the brake shoes on the drum 27 of the wheel 28.

In FIGS. 3 and 4, the supporting lever 21 is represented integral with the fork 29 so that the taring force from the assembly 34 and the force exerted by the lever 21 under the action of the load on the cap 19 are transmitted to the brakes by the same piece 21-29. However these two forces may also be transmitted to the brakes by separate pieces, so that the lever 21 does not undergo the action of the assembly 34.

It is well understood that if the shape of the frame, of the supporting and guiding wheels, and of the braked wheel are varied, they still fall within the scope of the invention, which provides a braking system depending upon the small vertical displacement of the articulation center of the load carrying platform, where this platform is weighed. Like in a balance, the measure is thus unaffected by the repartition of the load on the platform.

The vehicle 41 shown in FIGS. 6 and 7 may be thought of as a vehicle moving on a conveyor, or as a vehicle with four wheels rolling on two parallel rails. This vehicle comprises : a loading rectangular platform 42 provided with seats 43 for passengers and an underframe 44 wherein double flanged wheels 45 are mounted on forks at the corners of the underframe and guide the vehicle on a cylindrical rail 46.

The loading platform is connected to the underframe, for instance at the corners of a rectangle, by vertically elastic coupling means which are represented by coil springs fastened at their vertical extremities to the platform and to the underframe, and located in vertical planes 47, 48.

The loading platform is also supported by a central fulcrum 49 around which it may ocsillate. The fulcrum is not necessarily equidistant from the spring planes 47, 48 : this has been illustrated by showing the fulcrum at unequal distances l, l' from these planes. The elastic stiffnesses k of the springs 47 and k' of the spring 48, which are the drawback forces of the springs when they undego a vertical deflection of unit length, are arranged in relationship to the distances l, l' from the fulcrum in order that the sum of all vertical reactions of the springs on the platform cancel, so that the vertical reaction of the platform on the fulcrum is exactly equal to the weight of the load carrying platform, whatever the load and whatever its position in the platform. In the case of FIG. 6 this results is obtained if the springs are chosen with stiffnesses in inverse ratio to the distances l, l', so that : $k \times l = k' \times l''$. A similar relation holds in other arrangements of elastic coupling means between the platform and the underframe.

Straight below the fulcrum a braking system is mounted, consisting of a vertical bellows 50 filled with a hydraulic incompressible fluid, connected by ducts 51 to horizontal bellows 52 whereon grippers 53, 54, articulated about an axle 55 are fastened. Brake shoes 56, 57 are fastened to the clamping ends of the grippers.

The vertical reaction of the load carrying platform 41 on the fulcrum 49, equal to the weight of the platform, is transmitted to the bellows 50, 52, then to the grippers which are stopped by props 58 in a position where the brake shoes are separated by a small gap when the braking system is not in action.

Braking is actuated when the vehicle motion sets the brake shoes 56, 57 about a vertical strip 59 integral with the track, parallel to the guiding rail whose thickness at the loading edge is smaller than the free gap between the brake shoes. If the tapered strip has a final thickness larger than this free gap, it is well understood that the brake shoes are further separated and impart to the vehicle a braking force which is proportional to the vertical reaction of the load carrying platform 43, equal to its weight, which they undergo through the bellows and the grippers.

What is claimed as new is:

1. An automatic brake clutch system for a vehicle supporting a load, guided on a track by a guiding rail and having a relative motion with track components parallel to said guiding rail, said system providing a braking force proportional to a first weight whatever said load and its distribution in the vehicle, comprising:

a load carrying platform of the vehicle, bearing on an underframe provided with supporting and guiding means, by a center of articulation and by vertically elastic coupling means at corners with stiffnesses in inverse ratio to their distances from the center of articulation, said load and said load carrying platform having together said first weight;

braking means, located in said underframe, coming into contact at suitable places along the track with said track components in order to brake the relative motion between the vehicle and said track components where said braking means come into contact thereto, with said braking force proportional to said first weight; and a first braking assembly, whereon the center of articulation of said load carrying platform is bearing, adapted to transmit said fist weight to said braking means.

2. An automatic brake clutch system as set forth in claim 1 wherein the first braking assembly comprises a cap constituting said aarticulation center and having a screw adjustable height, and a lever integral with said cap and having a first end connected to said braking means and a second end pivoting around a pin supported by said underframe.

3. An automatic brake clutch system as set forth in claim 1, wherein said braking means brakes a single wheel by vertical pressure directly obtained from said transmitted first weight and wherein said coupling means are elastic blades.

4. An automatic brake clutch system for a vehicle supporting a load, guided on a track by a guiding rail and having a relative motion with track components parallel to said guiding rail, the loaded vehicle having a total weight constituted by a first weight and a second weight, and said system providing a braking force proportional to said total weight, whatever said load and its distribution in the vehicle comprising:

a load carrying platform of the vehicle, bearing on an underframe having said second weight and provided with supporting and guiding means, by a center of articulation and by vertically elastic coupling means at corners with stiffnesses in inverse ratio to their distances from the center of articulation, said load and said load carrying platform having together said first weight;

braking means located in said underframe, coming into contact at suitable places along the track with said track components in order to brake the relative motion between the vehicle and said track components where said brakign means come into contact thereto, with said braking force proportional to said total weight;

a first braking assembly, whereon the center of articulation of said load carrying platform is bearing, adapted to transmit said first weight to said braking means; and a second braking assembly providing to said braking means an adjustable constant force proportional to said second weight.

5. An automatic brake clutch system as set forth in claim 4, wherein said first weight and said adjustable constant force are provided independently to said braking means.

6. An automatic brake clutch system as set forth in claim 4 wherein the second braking assembly comprises elastic rings leaning on a beam of the underframe through a fork joint.

* * * * *